US005958467A

United States Patent [19]

Coble et al.

[11] Patent Number: 5,958,467

[45] Date of Patent: Sep. 28, 1999

[54] EXIT CHUTE FOR PHARMACEUTICAL TABLET PRESS MACHINE

[75] Inventors: Herbert Dale Coble, Raleigh; Robin Cary Maples, Knightdale; Ross Vincent Martin, Jr., Raleigh, all of N.C.

[73] Assignee: Glaxo Wellcome Inc., RTP, N.C.

[21] Appl. No.: 08/798,688

[22] Filed: Feb. 12, 1997

[51] Int. Cl.[6] ............................ B29C 43/08; B29C 43/58

[52] U.S. Cl. .......................... 425/136; 425/135; 425/171; 425/345; 425/215

[58] Field of Search .................................... 425/135, 136, 425/141, 171, 215, 216, 345

[56] References Cited

U.S. PATENT DOCUMENTS

| | | | |
|---|---|---|---|
| 2,399,894 | 5/1946 | Schulz | 425/215 |
| 3,294,235 | 12/1966 | Pitkin et al. | 425/345 |
| 3,776,675 | 12/1973 | Veneria | 425/215 |
| 3,982,865 | 9/1976 | Adams et al. | 425/149 |
| 4,570,229 | 2/1986 | Breen et al. | 425/149 |
| 4,817,006 | 3/1989 | Lewis | 425/149 |
| 5,213,818 | 5/1993 | Facchini et al. | 425/140 |
| 5,322,655 | 6/1994 | Ebey et al. | 264/40.5 |
| 5,522,512 | 6/1996 | Archer et al. | 209/580 |
| 5,596,865 | 1/1997 | Kramer | 53/428 |

FOREIGN PATENT DOCUMENTS 2 252 917 6/1975 France .

OTHER PUBLICATIONS

Patent Abstracts of Japan, vol. 014, No. 562 (C–0788), Dec. 13, 1990 & JP 02 243158A (Kikusui Seisakusho:KK), Sep. 27, 1990.

Patent Abstracts of Japan, vol. 096, No. 005, May 31, 1996 & JP 08 002666 A (Hitachi Metals Ltd), Jan. 9, 1996.

Manual Author: Courtoy, Bergensesteenweg, 186, B–1500, Halle, Belgium, Manual Covers and Table of Contents of the Courtoy Tablet Compression Machines (portions of the manuals that came with the tablet presses.) Courtoy Model R190, Document nr. 3103.195, May 9, 1991.

Manual Author: Courtoy, Bergensesteenweg, 186, B–1500, Halle, Belgium, Manual Covers and Table of Contents of the Courtoy Tablet Compression Machines (portions of the manuals that came with the tablet presses.) Courtoy Model R200, Document nr. 3201.039, Mar. 1990.

*Primary Examiner*—James P. Mackey

*Attorney, Agent, or Firm*—Charles E. Dadswell; Richard E. Jenkins

[57] ABSTRACT

A exit chute for a pharmaceutical tablet press machine comprising a first exit chute portion having a first end and a second end wherein the first end is adapted to be secured to the tablet press for receiving tablets formed thereby. A second exit chute portion is provided that has a first end and a second end and the first end is adapted to be removably secured to the second end of the first exit chute portion to form an extended tablet pathway, and the second chute portion includes an aperture therein whereby rejected tablets can be diverted to pass therethrough and accepted tablets will be allowed to pass through the second exit chute portion and out of the second end thereof. An air-actuated gate is mounted to the second exit chute portion that is adapted to be selectively moved from an open reject position wherein tablets are diverted through the aperture to a closed accept position wherein the tablets are allowed to pass through the second exit chute portion, and wherein the selective movement is in response to signals from the tablet press. A circuit device electrically connect the air-actuated gate and the tablet press and includes sensors for detecting whether the air-actuated gate is in a correct tablet accept or tablet reject position. The circuit device acts to stop the tablet press during the tablet pressing operation when a fault in the position of the air-actuated gate is detected.

25 Claims, 5 Drawing Sheets

EXIT CHUTE FOR PHARMACEUTICAL TABLET PRESS MACHINE

TECHNICAL FIELD

The present invention relates to pharmaceutical tablet press machines, and more particularly to an improved exit chute for pharmaceutical tablet press machines.

RELATED ART

As is well known to those skilled in the art, in conventional state of the art pharmaceutical tablet press machines (such as the Courtoy Model No. R-290 tablet press machine) the tablet press process proceeds wherein pharmaceutical tablets are pressed in molds to a suitable size and thickness and then ejected from the tablet press machine. In the tablet press machine, a linear voltage displacement transducer (LVDT) may typically be used to measure the thickness of tablets being formed, and the tablets are then ejected from the machine and transported downwardly through an exit chute to a tablet collection container. The conventional exit chutes typically includes at least a first chute gate that serves to divert rejected tablets from the exit chute to a defective tablet container in response to signals from the tablet press machine. Also, the conventional tablet exit chute is maintained in the tablet reject mode during start-up of the tablet press machine and until acceptable tablets are being consistently created by the tablet press machine. The exit chute will remain in the reject mode until the tablet press machine reaches a satisfactory tablet processing mode or automatic state, and an exit chute gate will then be actuated so as to allow tablets to pass through the exit chute to the accepted tablet container and not be diverted by the exit chute gate to the rejected tablet container.

As is also well known in the art, the tablet exit chute may also contain a second gate to selectively divert accepted tablets to an automatic weighing station (AWS). However, it is common to defeat the second exit chute gate so that accepted tablets pass thereby and directly into the accepted tablet container upon exit from the exit chute. Typical of tablet exit chutes utilized in the prior art is the chute presently provided on the Courtoy tablet press machine referenced hereinabove.

The conventional tablet exit chute is constructed so that the gate will default to tablet reject by means of a spring loaded solenoid valve actuator. Unfortunately, the conventional tablet exit chute possesses shortcomings that are well known to the art and tend to create inefficiencies in the use of the tablet press machine. Most significantly, conventional tablet exit chutes have a tendency to accept tablets from time to time although the exit chute gate is in the reject mode. This can be due to the exit chute gate mechanism seizing over time due to the solenoid becoming contaminated with tablet dust, or can be due to tablet jams in the exit chute accept/reject gate allowing out-of-specification tablets to pass through the exit chute to the accepted tablet container. Moreover, the conventional exit chute suffers the shortcoming of not providing a feedback to the tablet press if the exit chute accept/reject gate becomes seized or stuck in an improper state, and thus the table press continues to run and creates the risk of out-of-specification tablets being accepted and getting all the way to the packaging department of a pharmaceutical tablet manufacturing facility.

Thus, there exists a long-felt need for an improved tablet exit chute that will prevent the accept/reject gate from being seized in an improper state and out-of-specification tablets from being accepted and getting to the packaging department. There is also a long-felt need for an improved tablet exit chute that not only obviates the historical tendency of the exit chute accept/reject gate to seize in an improper state, but that also provides a feedback signal to the tablet press machine so as to stop the machine if the accept/reject gate is positioned in an improper state. Furthermore, there is a long-felt need for an improved tablet exit chute that utilizes positive movement of the accept/reject gate to and from both positions so as to minimize the likelihood of a seize-up or tablet jam of the gate that will lead to out-of-specification tablets being accepted and getting to the packaging department of a manufacturing facility.

Applicants' improved tablet exit chute has been developed to overcome all of the shortcomings of conventional tablet exit chutes described hereinabove and is believed to be a significant advancement in the art and to provide substantially improved operation of an associated tablet press machine.

SUMMARY OF THE INVENTION

In accordance with the invention, applicants provide a novel tablet exit chute for tablet press machines that includes an improved accept/reject gate. The tablet exit chute meets a long-felt need for an exit chute for use with a tablet press machine that eliminates the exit chute from accepting tablets while in the tablet reject mode. Thereby, the improved tablet exit chute can provide significant cost savings during the manufacture of pharmaceutical tablets in a pharmaceutical tablet manufacturing facility.

The tablet exit chute of the invention is used in conjunction with conventional tablet press machines such as the Courtoy Model No. R-290. The tablet exit chute comprises a first exit chute portion comprising an elongate conduit having a first end and a second end, and the first end is adapted to be secured to the tablet press for receiving tablets formed thereby. A second exit chute portion comprises a conduit housing having a first end and a second end wherein the conduit housing first end is adapted to be removably secured to the second end of the elongate conduit to form an extended tablet pathway. The conduit housing defines an aperture therein wherein rejected tablets can be diverted to pass therethrough and accepted tablets allowed to pass through the conduit housing and out of the second end thereof.

An air-actuated gate is mounted to the conduit housing and adapted to be selectively moved from an open reject position wherein tablets are diverted through the aperture to a closed accept position wherein tablets are allowed to pass through the conduit housing and out of the second end thereof, and wherein the selective movement is in response to signals from the tablet press. Circuit means electrically connect the air-actuated gate and the tablet press and includes sensor means for detecting whether the air-actuated gate is in a correct accept or reject position, and the circuit means further acts to stop the tablet press during the tablet pressing operation when a fault in the position of the air-actuated gate is detected.

It is therefore the object of the present invention to provide an improved exit chute for a pharmaceutical tablet press machine that prevents tablets from being accepted when the accept/reject gate is in the reject mode.

It is another object of the present invention to provide an improved exit chute for a pharmaceutical tablet press machine that prevents out-of-specification tablets from being accepted and getting to the packaging department of the tablet manufacturing facility.

It is another object of the present invention to provide an improved exit chute for a pharmaceutical tablet press machine that prevents tablet jams and/or tablet dust from seizing the exit chute accept/reject gate in an improper position.

It is another object of the present invention to provide an improved exit chute for a pharmaceutical press machine that provides positive movement of the accept/reject gate between both of the accept and reject positions so as to minimize the possibility of the accept/reject gate seizing in an improper position.

It is still another object of the present invention to provide an improved exit chute for a pharmaceutical tablet press machine that provides a feedback signal to the tablet press machine regarding the accept/reject gate position so as to stop the tablet press machine if the gate is in an incorrect mode or position.

It is still another object of the present invention to provide an improved exit chute for a pharmaceutical tablet press machine that prevents movement of the accept/reject gate plate on its actuator shaft by providing a key therebetween.

Some of the objects of the invention having been stated, other objects will become evident as the description proceeds, when taken in connection with the accompanying drawings described in detail below.

BEST MODE FOR CARRYING OUT THE INVENTION

Figure 1:
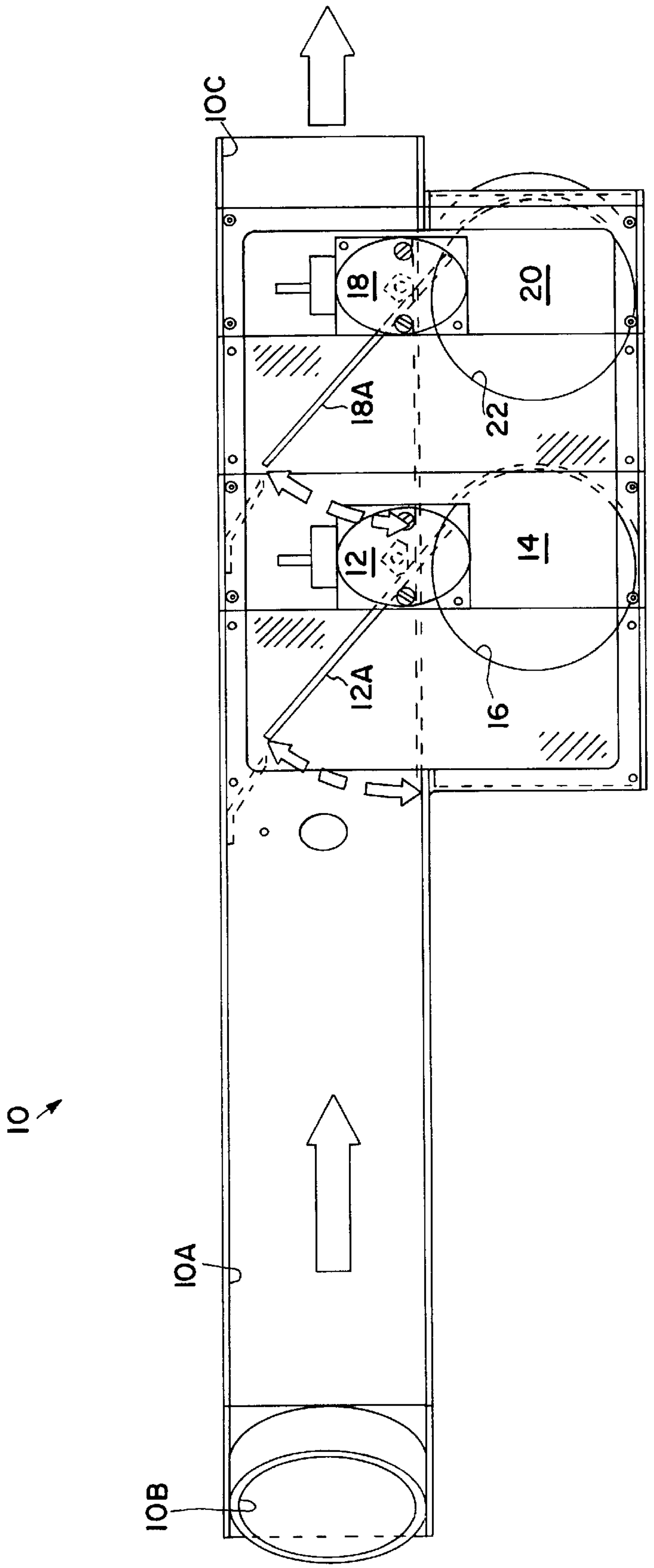
FIG. 1 PRIOR ART
FIG. 1 is a top plan view of a prior art tablet exit chute.
Figure 2:
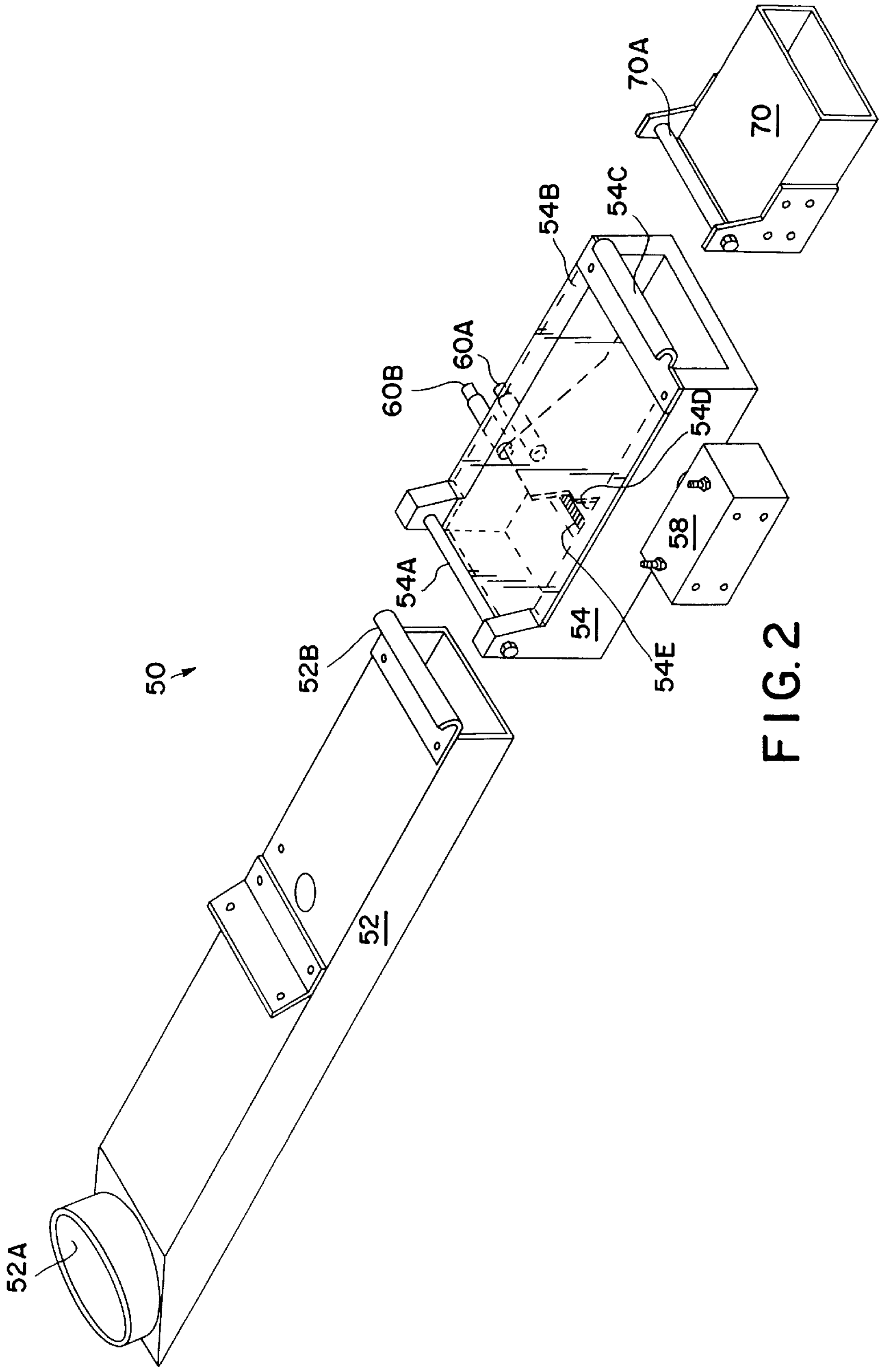
FIG. 2 is an exploded view of the tablet exit chute of the present invention.
Figure 3:
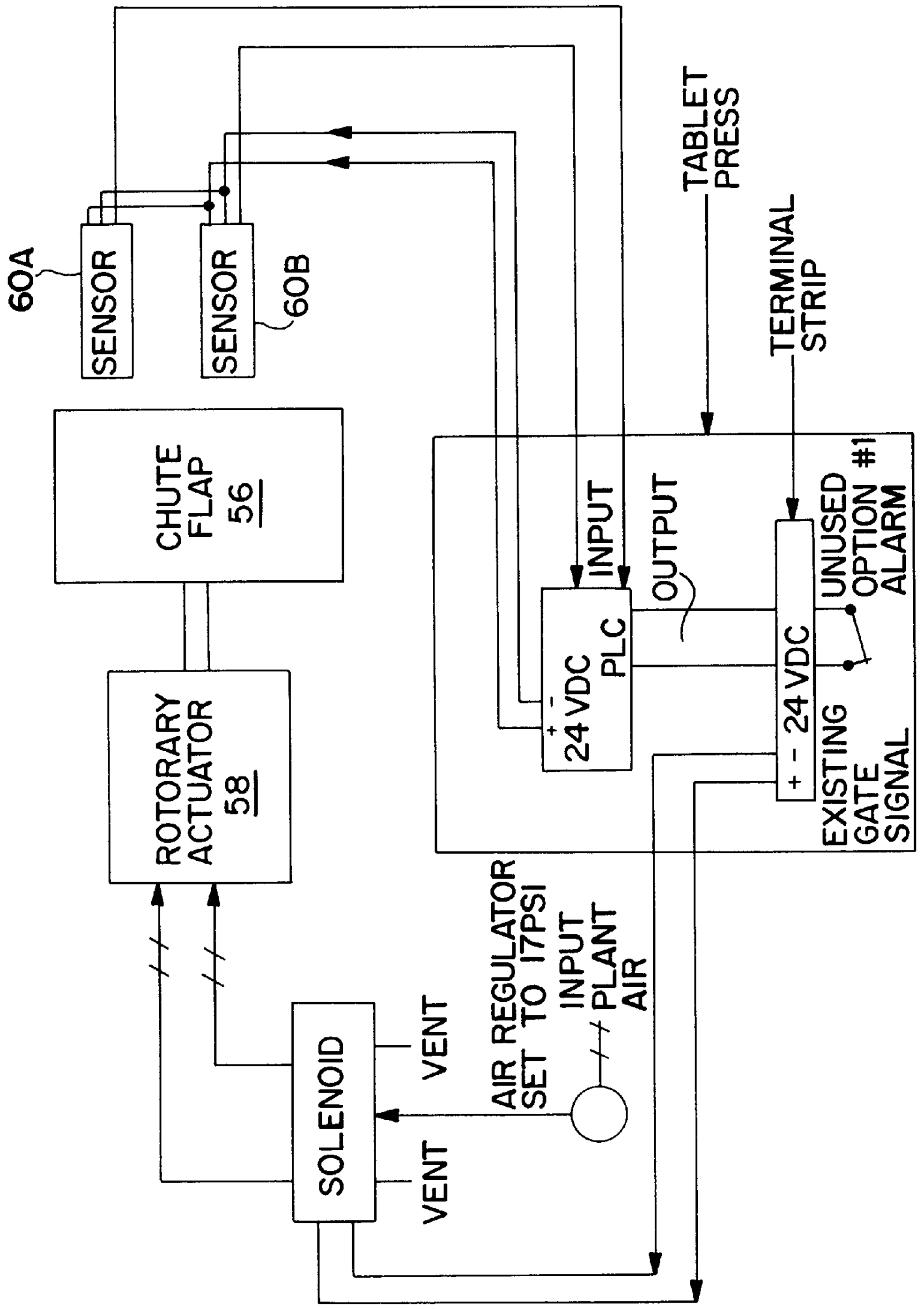
FIG. 3 is a schematic diagram of the electrical and pneumatic connections of the tablet exit chute of the present invention.

Referring now to FIGS. 1 through 3 of the drawings, a preferred embodiment of a tablet exit chute for use in combination with a tablet press machine in accordance with the present invention is shown and generally designated 50. As has been stated hereinbefore, apparatus 50 is intended for use on many different types of commercial tablet press machines but is particularly well suited for use with a Courtoy Brand Model No. R-290 tablet press machine.

Figure 1A:
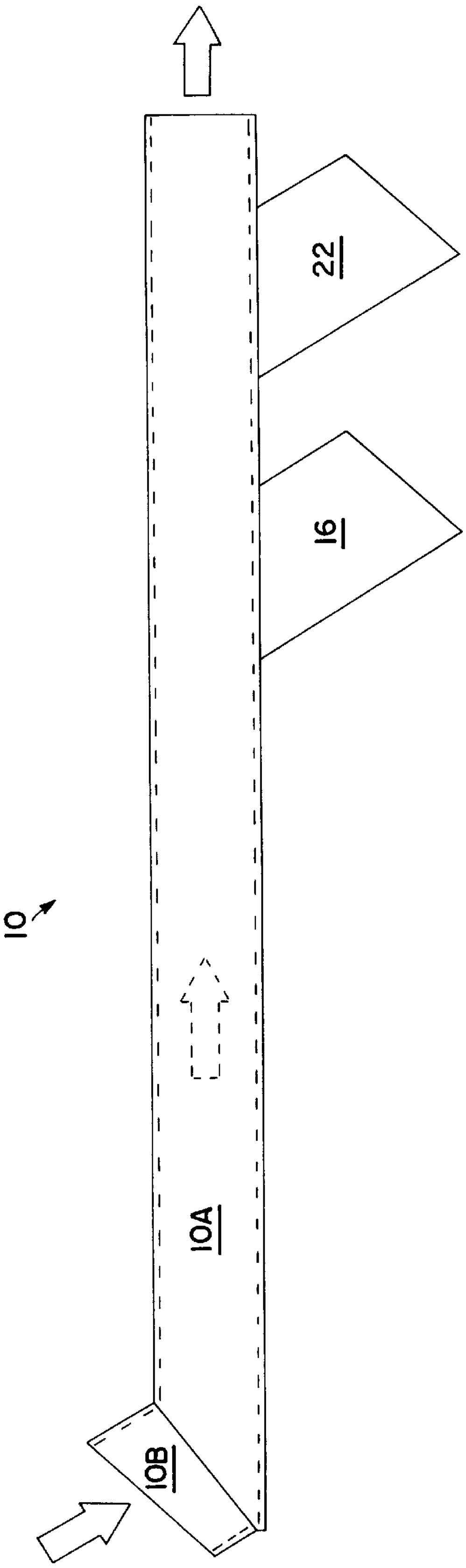
FIG. 1A PRIOR ART
FIG. 1A is a side elevation view of the prior art tablet exit chute shown in FIG. 1.

Referring more particularly now to FIGS. 1 and 1A, a prior art exit chute is shown and generally designated 10 for better understanding of the present invention. Exit chute 10 comprises a unitary housing having an entrance conduit 10A that is attached at its open end to a tablet press machine by means of sleeve 10B. A first spring-loaded solenoid valve 12 is mounted on support plate 14 and serves to motivate gate plate 12A from an upwardly extending tablet reject position to a laterally extending tablet accept position (see phantom lines). Solenoid valve 12 is spring urged into a default tablet reject position wherein tablets that are received into entrance conduit 10A from the tablet press (not shown) will be transported by gravity downwardly into contact with upwardly extending gate plate 12A and deflected into reject tube 16 (see also FIG. 1A). Reject tube 16 will be connected to a suitable container for collecting rejected tablets that are dispensed from the tablet press machine. When solenoid valve 12 is actuated so as to motivate gate plate 12A to its laterally extending second position, tablets received by entrance conduit 10A from the tablet press machine will be transported by solenoid valve 12 and be dispensed from end 10C of exit chute 10 into an accepted tablet container (if second spring-loaded solenoid valve 18 mounted on support plate 20 is in its defeated position wherein second gate plate 18A has been urged from its first upwardly extending position to its second laterally extending position (shown by phantom lines).

Although second spring-loaded solenoid valve 18 is customarily defeated during use of prior art exit chute 10, solenoid valve 18 can be used as part of an automatic weighing system (AWS) whereby gate plate 18A periodically is allowed to be resiliently urged into its upwardly extending position so as to deflect tablets that have been accepted by solenoid valve 12 into weighing tube 20 that leads to a suitable automatic tablet weighing system for selectively weighing certain selected tablets that are dispensed from the tablet press machine into exit chute 10.

Thus, prior art exit chute 10 shown in FIGS. 1 and 1A is normally operated with second solenoid valve 18 in a defeated position and first solenoid valve 12 used to determine whether a tablet entering into entrance conduit 10A of exit chute 10 will be rejected into reject tube 16 or allowed to pass through open end 10C of exit chute 10 into a tablet collection container (not shown). Unfortunately, as noted in the discussion of the prior art set forth in detail above, apparatus 10 suffers from a tendency of solenoid valve 12 to jam or seize so that gate plate 12A is an improper location and the accept/reject gate accepts tablets when in the reject mode and does not provide a feedback signal to the tablet press machine that the accept/reject gate is improperly functioning. Thus, out-of-specification tablets are allowed to pass through exit chute 10 and typically get to the packaging department of a pharmaceutical tablet manufacturing facility before being discovered. Allowing the defective tablets to get to the packaging department can result in increased costs in locating and correcting the problem at this late stage of the tablet manufacturing process.

Figure 2A:
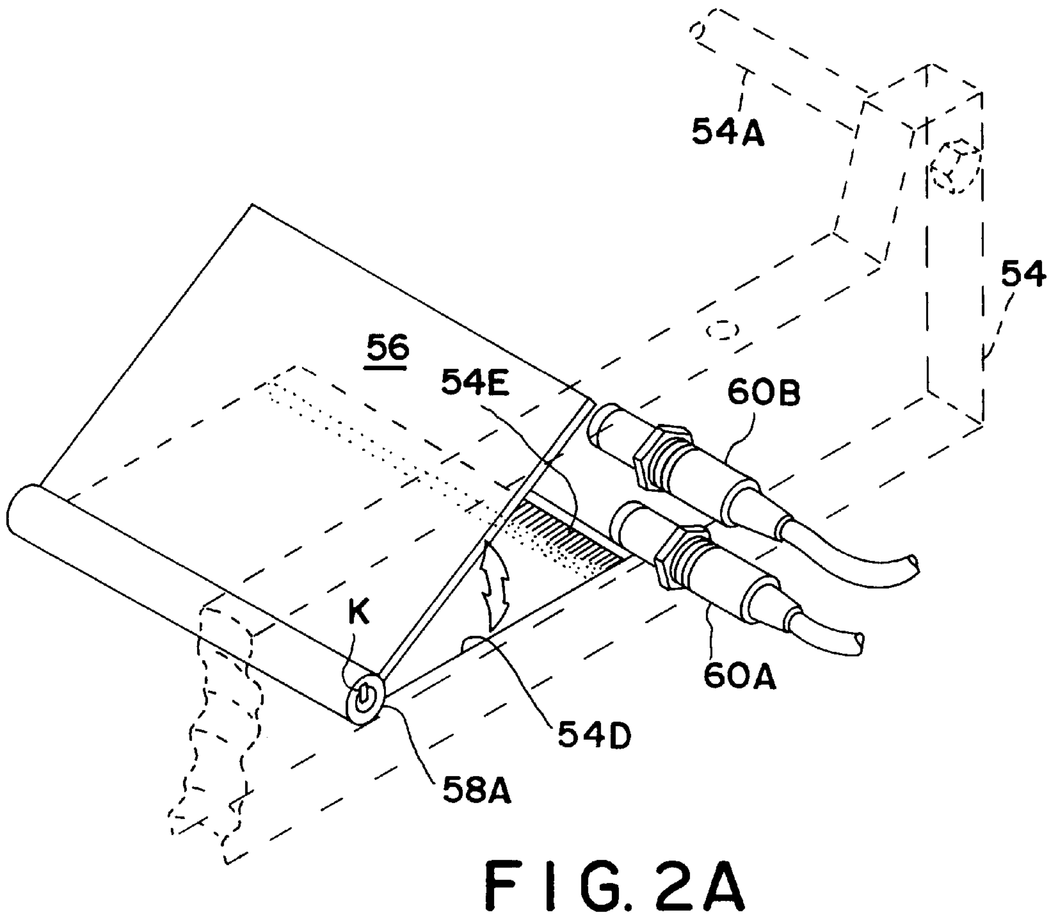
FIG. 2A is an enlarged fragmentary view of the pair of proximity sensors incorporated into the second exit chute portion of the tablet exit chute.

Referring now specifically to FIGS. 2 and 2A of the drawings, applicants' improved exit chute is shown and generally designated 50. Exit chute 50 comprises an elongate conduit 52 that is removably connected by means of sleeve 52A at the upper end to a tablet press machine (not shown). The other end of conduit 52 is open and includes hook 52B fixedly mounted to the top thereof for removably engaging conduit housing 54 by means of pin 54A provided at the first or upper end thereof. Conduit housing 54 is most suitably constructed of a plastic material such as DELRON® (whereas elongate conduit 52 is most suitably formed from sheet metal such as stainless steel) and is provided with a transparent and removable plastic top 54B. The first or upper end of conduit housing 54 is open as is also the second or lower end which includes a latch 54C that serves to removably secure transition conduit 70 thereto by means of pin 70A mounted at the front end of transition conduit 70. Transition conduit 70 serves as the terminal end of exit chute 50 and transports accepted tablets to a suitable collection container (and, if desired, a metal detection device may be conventionally interposed between transition conduit 70 and the tablet collection container).

Referring still to FIGS. 2 and 2A, conduit housing 54 further includes an aperture 54D in the bottom surface thereof having a bristle brush 54E mounted along the length of the top edge thereof most proximate to the front end of conduit housing 54. Most suitably, aperture 54D is a square or rectangular opening in the floor of conduit housing 54 and includes gate plate 56 pivotably mounted therein so as to extend from a flat co-planer position with the bottom surface of conduit housing 54 to a raised upwardly-extending position with its top edge in contact or near contact with plastic top 54B so as to deflect tablets being received from transition conduit 52 through aperture 54D. Thus, gate plate 56 is adapted to be pivoted from a tablet accept first position co-planer with the bottom surface of conduit housing 54 to a tablet reject second upwardly raised position (see FIGS. 2 and 2A). A rotary actuator 58 provides two-way positive motion by means of two air lines from an air regulator (not shown) mounted in the tablet press machine and serves to positively actuate gate plate 56 between the lowered tablet accept and raised tablet reject positions in accordance with signals from the tablet press machine to a 24 volt DC solenoid (not shown) that is operatively connected to rotary actuator 58. Applicants intend that the air regulator (not shown) will utilize the existing 90 PSI air pressure and gate control signals provided by the Courtoy Model No. R-290 tablet press machine.

Thus, pursuant to signals from the tablet press machine to the solenoid (not shown) of rotary actuator 58, rotary actuator 58 will be caused to positively move from tablet accept to tablet reject positions by means of the air provided from the two air lines extending from the tablet press machine and connected thereto. It will be appreciated that rotary actuator 58 is configured so as to default to the tablet reject position wherein gate plate 56 is raised so as to open aperture 54D in the bottom of conduit housing 54. Also, applicants note that gate plate 56 is fixedly mounted to rotary actuator shaft 58A with a key K (see FIG. 2A) to prevent rotational movement of gate plate 56 on rotary actuator shaft 58A. Bristle brush 54E is provided to prevent tablet jams from seizing gate plate 56 in an improper state and thereby reduces the risk of out-of-specification tablets being passed through conduit housing 54 and into an accepted tablet container. Moreover, bristle brush 54E helps to prevent damage to tablets during movement of gate plate 56 between the tablet accept and tablet reject positions.

Still referring to conduit housing 54, it will be appreciated that conduit housing 54 further includes two spaced-apart proximity sensors 60A, 60B (see FIG. 2A) which serve to detect the presence of gate plate 56 in the tablet accept lower position and tablet reject raised position, respectively. If gate plate 56 is in an improperly lowered or raised position, proximity sensors 60A, 60B, respectively, will detect the improper state of gate plate 56 and emit a signal that is sent to a PLC controller (see FIG. 3) that in turn provides an output to the tablet press machine that results in a shut down of the machine and an alarm signal being emitted therefrom. In this fashion, tablet exit chute 50 provides a positive shut-off of the associated tablet press machine if the gate plate is in an improper state so as to reduce the risk of out-of-specification tablets from being passed through exit chute 50 and into an accepted tablet collection container.

Applicants also note the modular nature of construction of exit chute 50 so as to allow for the use of multiple conduit housing units 54 between transition conduit 52 and transition conduit 70 as may be desired. For example, two conduit housings may be utilized wherein first conduit housing 54 serves as a tablet accept/reject gate and second conduit housing 54 serves as the automatic weighing system (AWS) function gate. Other configurations can be constructed with the modular components of the instant invention as may be required by the user. However, applicants' invention allows for the use of only a single conduit housing 54 if the automatic weighing system function is not desired and thus avoids the need to defeat the second gate mechanism as is practiced with the prior art exit chute described hereinbefore in FIGS. 1 and 1A.

Applicants' novel tablet exit chute 50 is designed so as to obviate the necessity for significant modifications to the existing tablet press machine. The tablet accept/reject gate plate 56 will remain in the tablet reject mode until the tablet press machine reaches the automatic state of operation. Gate plate 56 is keyed with key K to rotary actuator shaft 58A to insure that it does not slip relative thereto, and no tablets will be accepted when gate plate 56 of exit chute 50 is in the reject position. The solenoid of rotary actuator 58 will utilize the existing 24 volt DC signal that is currently provided by the tablet press machine to actuate the accept/reject gate of the conventional exit chute shown in FIGS. 1 and 1A. Moreover, the Courtoy Model No. R-290 tablet press machine will be caused to shut down and the "Option 1" alarm will appear on the memo control screen when the accept/reject gate plate 56 of exit chute 50 is found to be in the wrong state by means of an output from the PLC used therewith and that is connected to the unused Option 1 alarm of the tablet press. When the accept/reject gate plate 56 returns to the correct state the tablet press can resume operation.

Applicants prefer that the PLC be housed in the rear lower section of the Courtoy Model No. R-290 tablet press machine in proximity to existing control relays and wiring. As is noted hereinbefore, most preferably an air regulator (not shown) is installed and two lines are run therefrom to a DC solenoid attached to the rotary actuator 58. The DC solenoid has two air lines connected to rotary actuator 58 that shuttle as directed by the existing 24 Volt DC signal that is currently provided by the tablet press (see particularly FIG. 3).

Although other parts may be utilized, applicants contemplate that rotary actuator 58 is a PHd brand, Part No. 0180502-3-01 rotary actuator. The solenoid used with rotary actuator 58 is most suitably a HUMPHREY brand, Part No. H040-4E1-PLL-24VDC solenoid, and proximity sensors 60A, 60B are most suitably TURCK brand, Part No. Ni-2-G08K-AP6X sensors. The programmable logic computer (PLC) utilized by exit chute 50 is most suitably a ALLEN BRADLEY brand, Part No. 1761-L16BWA PLC. Of course, applicants further contemplate that other components can be utilized within the scope of the instant invention.

It will be understood that various details of the invention may be changed without departing from the scope of the invention. Furthermore, the foregoing description is for the purpose of illustration only, and not for the purpose of limitation—the invention being defined by the claims.

What is claimed is:

1. In combination a pharmaceutical tablet press and a tablet exit chute, said tablet exit chute comprising:

(a) a first exit chute portion comprising an elongate conduit having a first end and a second end, said first end being adapted to be secured to said tablet press for receiving tablets formed thereby;

(b) a second exit chute portion comprising a conduit housing having a first end and a second end wherein said conduit housing first end is adapted to be removably secured to the second end of said elongate conduit to form an extended tablet pathway, said conduit housing defining an aperture therein wherein rejected tablets can be diverted to pass therethrough and accepted tablets allowed to pass through said conduit housing and out of the second end thereof;

(c) an air-actuated gate mounted to said conduit housing and adapted to be selectively moved from an open reject position wherein tablets are diverted through said aperture to a closed accept position wherein tablets are allowed to pass through said conduit housing and out of the second end thereof, said selective movement being in response to signals from said tablet press; and (d) circuit means electrically connecting said air-actuated gate and said tablet press and including sensor means for detecting whether said air-actuated gate is in a correct accept or reject position, said circuit means serving to stop said tablet press during the tablet press operation when a fault in the position of said air-actuated gate is detected.

2. The combination according to claim 1 wherein said second end of said elongate conduit includes a hook element and said first end of said conduit housing includes a latchingly engagable pin element to facilitate removable securement of said conduit housing to said elongate conduit.

3. The combination according to claim 1 wherein said air-actuated gate comprises a solenoid driven rotary actuator that provides positive actuation between both of said accept and reject positions, and a flap plate element secured to said rotary actuator and positioned in said aperture so as to extend co-planar with the bottom surface of said conduit housing in said accept position and to extend upwardly therefrom towards the first end of said conduit housing in said reject position.

4. The combination according to claim 3 wherein said rotary actuator acts to default to said open reject position.

5. The combination according to claim 3 wherein said rotary actuator includes a rotary actuator shaft and said flap plate element is slidably mounted thereon and keyed thereto to prevent rotational movement between said shaft and said flat plate element.

6. The combination according to claim 5 including a bristle brush element provided along a portion of said aperture proximate to the first end of said conduit housing so as to be contacted by said flap plate element when said flap plate element is positioned in said closed accept position.

7. The combination according to claim 1 wherein said sensor means of said circuit means comprises a pair of proximity sensors mounted in spaced-apart relationship on said conduit housing such that the first proximity sensor is adjacent said flap plate element in said closed position and the second proximity sensor is adjacent said flap plate element in said open position, and said first and second proximity sensors generate a status signal when said flap plate element is properly positioned in said closed accept and open reject positions, respectively.

8. The combination according to claim 7 wherein said circuit means includes a PLC that receives said status signals from said pair of sensors and sends a corresponding control signal to said tablet press.

9. The combination according to claim 1 including a transition conduit that is removably secured to the second end of said conduit housing for directing tablets to a selected dispensing site.

10. In combination a pharmaceutical tablet press and a tablet exit chute, said tablet exit chute comprising:

(a) a first exit chute portion comprising an elongate conduit having a first end and a second end, said first end being adapted to be secured to said tablet press for receiving tablets formed thereby;

(b) a second exit chute portion comprising a conduit housing having a first end and a second end wherein said conduit housing first end is adapted to be removably secured to the second end of said elongate conduit to form an extended tablet pathway, said conduit housing defining an aperture therein wherein rejected tablets can be diverted to pass therethrough and accepted tablets allowed to pass through said conduit housing and out of the second end thereof;

(c) an air-actuated gate mounted to said conduit housing and adapted to be selectively moved from an open reject position wherein tablets are diverted through said aperture to a closed accept position wherein tablets are allowed to pass through said conduit housing and out of the second end thereof, said selective movement being in response to signals from said tablet press, and wherein said air-actuated gate acts to default to said open reject position;

(d) circuit means electrically connecting said air-actuated gate and said tablet press and including sensor means for detecting whether said air-actuated gate is in a correct accept or reject position, said circuit means serving to stop said tablet press during the tablet press operation when a fault in the position of said air-actuated gate is detected; and (e) a transition conduit that is removably secured to the second end of said conduit housing for directing tablets to a selected dispensing site.

11. The combination according to claim 10 wherein said second end of said elongate conduit includes a hook element and said first end of said conduit housing includes a latchingly engagable pin element to facilitate removable securement of said conduit housing to said elongate conduit.

12. The combination according to claim 10 wherein said air-actuated gate comprises a solenoid driven rotary actuator that provides positive actuation between both of said accept and reject positions, and a flap plate element secured to said rotary actuator and positioned in said aperture so as to extend co-planar with the bottom surface of said conduit housing in said accept position and to extend upwardly therefrom towards the first end of said conduit housing in said reject position.

13. The combination according to claim 12 wherein said rotary actuator includes a rotary actuator shaft and said flat plate element is slidably mounted thereon and keyed thereto to prevent rotational movement between said shaft and said flat plate element.

14. The combination according to claim 13 including a bristle brush element provided along a portion of said aperture proximate to the first end of said conduit housing so as to be contacted by said flap plate element when said flap plate element is positioned in said closed accept position.

15. The combination according to claim 10 wherein said sensor means of said circuit means comprises a pair of proximity sensors mounted in spaced-apart relationship on said conduit housing such that the first proximity sensor is adjacent said flap plate element in said closed position and the second proximity sensor is adjacent said flap plate element in said open position, and said first and second proximity sensors generate a status signal when said flap plate element is properly positioned in said closed accept and open reject positions, respectively.

16. The combination according to claim 15 wherein said circuit means includes a PLC that receives said status signals from said pair of sensors and sends a corresponding control signal to said tablet press.

17. A tablet exit chute for a pharmaceutical tablet press, said tablet exit chute comprising:

(a) a first exit chute portion comprising an elongate conduit having a first end and a second end, said first end being adapted to be secured to the tablet press for receiving tablets formed thereby;

(b) a second exit chute portion comprising a conduit housing having a first end and a second end wherein said conduit housing first end is adapted to be removably secured to the second end of said elongate conduit to form an extended tablet pathway, said conduit housing defining an aperture therein wherein rejected tablets can be diverted to pass therethrough and accepted tablets allowed to pass through said conduit housing and out of the second end thereof;

(c) an air-actuated gate mounted to said conduit housing and adapted to be selectively moved from an open reject position wherein tablets are diverted through said aperture to a closed accept position wherein tablets are allowed to pass through said conduit housing and out of the second end thereof, said selective movement being in response to control signals from the tablet press; and (d) circuit means electrically connecting said air-actuated gate to the tablet press and including sensor means for detecting whether said air-actuated gate is in a correct accept or reject position, said circuit means serving to stop the tablet press during the tablet press operation when a fault in the position of said air-actuated gate is detected.

18. The tablet exit chute according to claim 17 wherein said second end of said elongate conduit includes a hook element and said first end of said conduit housing includes a latchingly engagable pin element to facilitate removable securement of said conduit housing to said elongate conduit.

19. The tablet exit chute according to claim 17 wherein said air-actuated gate comprises a solenoid driven rotary actuator that provides positive actuation between both of said accept and reject positions, and a flap plate element secured to said rotary actuator and positioned in said aperture so as to extend co-planar with the bottom surface of said conduit housing in said accept position and to extend upwardly therefrom towards the first end of said conduit housing in said reject position.

20. The tablet exit chute according to claim 19 wherein said rotary actuator acts to default to said open reject position.

21. The tablet exit chute according to claim 19 wherein said rotary actuator includes a rotary actuator shaft and said flap plate element is slidably mounted thereon and keyed thereto to prevent rotational movement between said shaft and said flat plate element.

22. The tablet exit chute according to claim 21 including a bristle brush element provided along a portion of said aperture proximate to the first end of said conduit housing so as to be contacted by said flap plate element when said flap plate element is positioned in said closed accept position.

23. The tablet exit chute according to claim 17 wherein said sensor means of said circuit means comprises a pair of proximity sensors mounted in spaced-apart relationship on said conduit housing such that the first proximity sensor is adjacent said flap plate element in said closed position and the second proximity sensor is adjacent said flap plate element in said open position, and said first and second proximity sensors generate a status signal when said flap plate element is properly positioned in said closed accept and open reject positions, respectively.

24. The tablet exit chute according to claim 23 wherein said circuit means includes a PLC that receives said status signals from said pair of sensors and sends a corresponding control signal to the tablet press.

25. The tablet exit chute according to claim 17 including a transition conduit that is removably secured to the second end of said conduit housing for directing tablets to a selected dispensing site.

* * * * *